United States Patent
Carroll et al.

[11] Patent Number: 6,000,433
[45] Date of Patent: Dec. 14, 1999

[54] PRECISION FILTERED CHOKE

[75] Inventors: John B. Carroll, Irwin; Michael McNeil, McKeesport; Gary M. Sich, Irwin, all of Pa.

[73] Assignee: Westinghouse Air Brake Co., Wilmerding, Pa.

[21] Appl. No.: 08/794,302

[22] Filed: Feb. 3, 1997

[51] Int. Cl.⁶ ............................................. F15D 1/02
[52] U.S. Cl. ............................. 138/41; 138/42; 138/44
[58] Field of Search .......................... 138/41, 42, 44

[56] References Cited

U.S. PATENT DOCUMENTS

| | | | |
|---|---|---|---|
| 1,797,280 | 3/1931 | Zerk | 138/41 |
| 2,375,646 | 5/1945 | Grossi | 138/41 |
| 2,457,578 | 12/1948 | Maliphant | 138/41 |
| 2,645,099 | 7/1953 | Cumming | 138/41 |
| 3,109,459 | 11/1963 | Lee, II et al. | 138/41 |
| 3,490,561 | 1/1970 | Colgan | 138/42 |
| 3,642,031 | 2/1972 | Wright | 138/45 |
| 4,009,592 | 3/1977 | Boerger | 138/41 |
| 4,171,209 | 10/1979 | Brown | 138/41 |
| 4,426,213 | 1/1984 | Stavropoulus | 138/41 |

*Primary Examiner*—Denise L. Ferensic
*Assistant Examiner*—James F. Hook
*Attorney, Agent, or Firm*—James Ray & Associates

[57] ABSTRACT

Choke for connection to a fluid flow passage for controlling fluid flow through the passage in a predetermined direction. The choke has structure for attachment to the fluid passage. It also has an internal fluid flow passage, which has at least one constriction. One or more mesh filters are located in the internal fluid flow passage of the choke, upstream of the constriction, to remove debris from the fluid which would otherwise interfere with fluid flow through the orifice.

18 Claims, 5 Drawing Sheets

PRECISION FILTERED CHOKE

FIELD OF THE INVENTION

The present invention relates, in general, to a choke for placement in a fluid path for permitting a fluid to pass at an accurately controlled rate, and, more particularly relates to a choke for controlling the rate at which compressed air is exhausted from a volume, and most particularly, the instant invention relates to a choke for use in a brake air valve to exhaust air from an internal space in the valve in a precisely controlled time.

BACKGROUND OF THE INVENTION

Many chokes are known for controlling a flow rate of a fluid in a fluid passage. Typically, these consist of orifices or venturis placed in the passage to reduce the flow which results from a given pressure drop across the choke. Fluid flow systems often have problems involving contamination by particulate contamination or other debris which may become lodged in the choke passageway, and change the relationship between the pressure drop across the choke, and the flow rate through it. Generally, the effect of debris is to decrease the flow rate at a given pressure drop.

The specific application for which the present invention is intended is as a precision choke for exhausting air from an enclosed volume in a railroad brake air valve at a precisely controlled rate.

The prior art choke for this application is formed as a plug having a pipe thread on its exterior for assembly into an exhaust port in a casting of the brake valve. The device has a constriction, and it has a felt plug upstream of the constriction to remove debris. This configuration has a disadvantage in that the felt plug introduces a pressure drop which is difficult to control. Hence, this prior art choke provides only an imprecise choking action. That is, the flow rate for a given pressure drop is uncertain within a range of values due to uncertainties due to the packing of the plug, and variations in assembly of the felt plug to the choke. An additional disadvantage of the prior art choke is that the felt plug does not provide an absolute barrier against contaminant particles above a predetermined size, due to the random disposition of fibers in the felt.

SUMMARY OF THE INVENTION

In one aspect, this invention provides a choke for connection to a fluid flow passage for controlling fluid flow through the passage. The choke is required only to function for fluid flow in a single predetermined direction. The choke has means for attachment to the fluid passage. It also has an internal fluid flow passage, which has at least one constriction. One or more mesh filters are located in the internal fluid flow passage of the choke. The mesh filters are located upstream of the constriction for flow in the predetermined direction of the choke. The mesh filters serve to remove debris from the fluid which would otherwise interfere with fluid flow through the orifice.

In an additional aspect, the present invention provides a method of producing a precision choke for precise control of fluid flow in a fluid flow passage. The method includes forming a first choke portion which has a constriction of a predetermined size. This choke portion is formed of a material having corrosion resistance and good dimensional stability. The method also includes providing a second choke portion, the second choke portion being for support of one or more mesh filters. The method also includes bonding the mesh filter or filters to the second choke portion, and assembling the second choke portion to the first choke portion.

In another aspect, the present invention provides a method of producing a precision choke for precise control of fluid flow in a fluid flow passage. The method includes forming a first choke portion which has a constriction of a predetermined size. This portion of the choke is formed of a material which has good corrosion resistance, and good dimensional stability. The method also includes creating a mold for forming a second portion which is for support of one or more mesh filters. One or more pieces of the mesh filter material are placed in the mold. A liquid material is then placed in the mold, and the liquid material is caused to solidify in a manner which bonds it to the mesh filters and forms the second portion of the choke which supports the mesh. The first and second portions are then assembled to form the completed choke.

OBJECTS OF THE INVENTION

It is, therefore, one of the primary objects of the present invention to provide a choke for precise control of a flow rate of a fluid in a fluid flow passage.

It is a further object of the present invention to provide a choke which provides a precise relationship between flow rate and pressure drop across the choke.

Another object of the present invention is to provide a choke for control of a flow rate of fluid in a passage, the choke having a filter for removing debris from the fluid which would alter the performance of the choke.

It is an additional object of the present invention to provide a choke which has a mesh filter which introduces a pressure drop which is highly reproducible, so that the flow properties of the choke do not vary from one choke to another.

Another object of the present invention is to provide a choke which has a mesh filter which is bonded to a support structure.

A further object of the present invention is to provide a filter which provides an absolute barrier to contaminant particles which are larger than a predetermined size, this size being the size of the open spaces in the mesh filter.

In addition to the various objects and advantages of the present invention which have been generally described above, there will be various other objects and advantages of the invention that will become more readily apparent to those persons who are skilled in the relevant art from the following more detailed description of such invention, particularly, when such detailed description is taken in conjunction with the attached drawing figures and with the appended claims.

Figure 1:
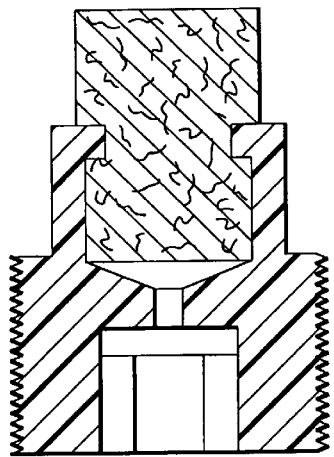
FIG. 1 shows a prior art choke which has a felt plug filter located upstream of the constriction of the choke.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures, for the sake of clarity and understanding of the invention.

Figure 2A:
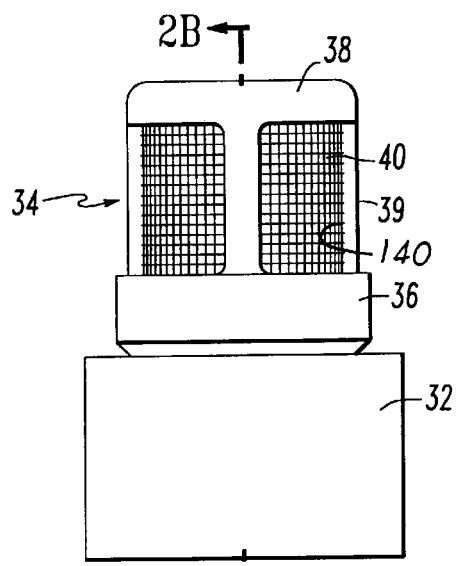
FIG. 2A shows a side view of a first embodiment of the present invention.
Figure 2B:
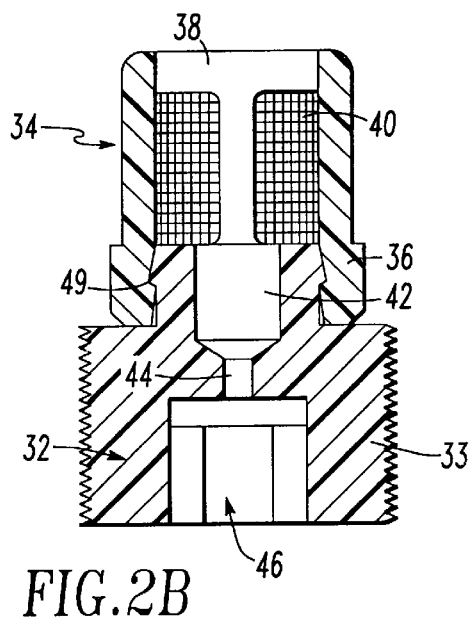
FIG. 2B shows a median section of the first embodiment.
Figure 2C:
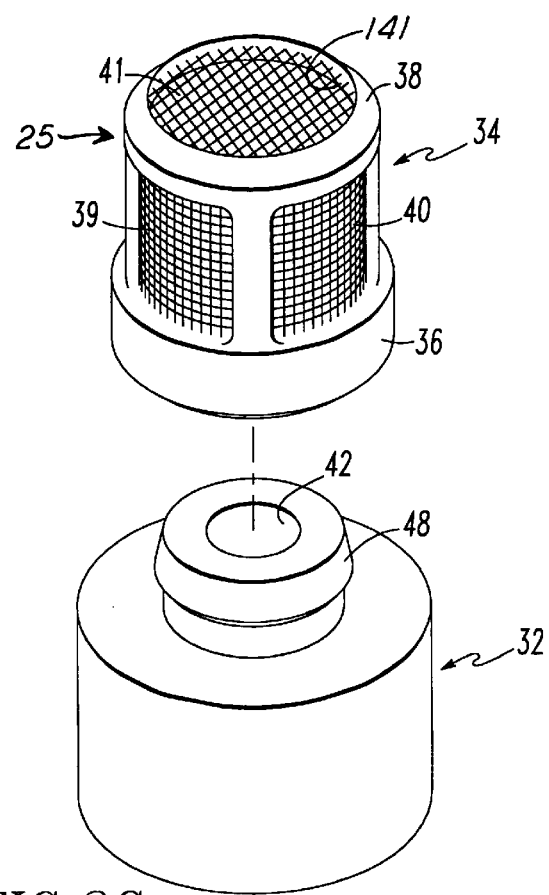
FIG. 2C shows assembly of the choke portion and the filter portion of the first embodiment.
Figure 3A:
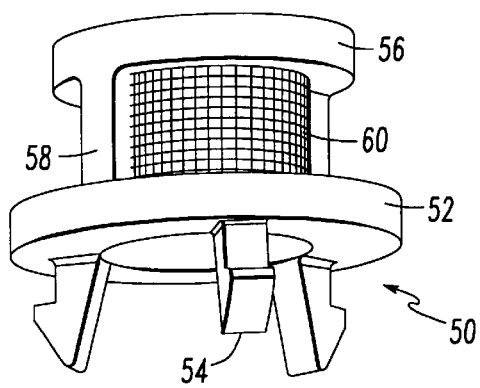
FIG. 3 shows several views and a cross-section of a filter portion of a second embodiment of the present invention.
Figure 3B:
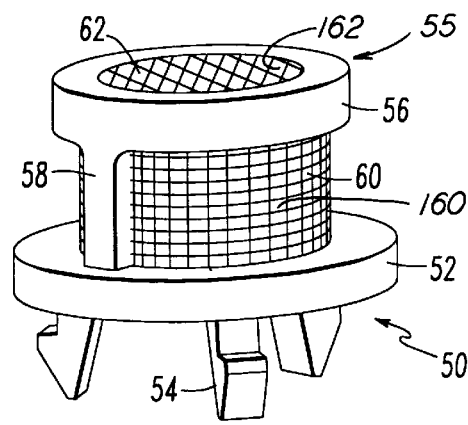
Figure 3C:
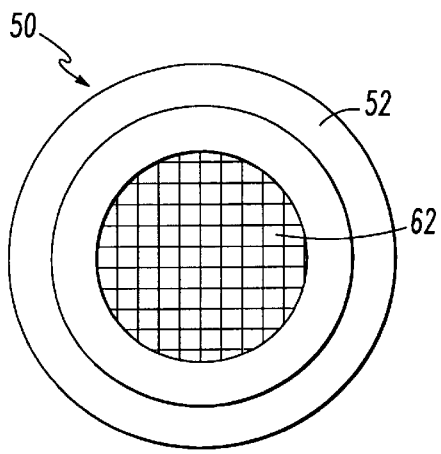
Figure 3D:
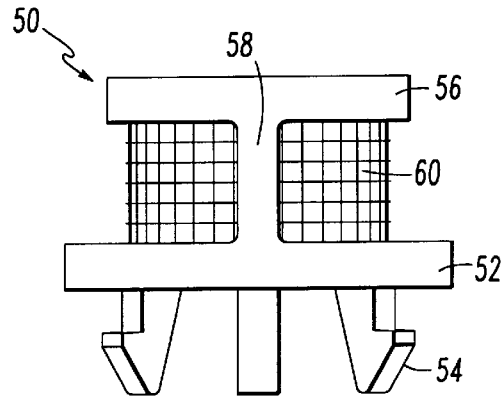
Figure 3E:
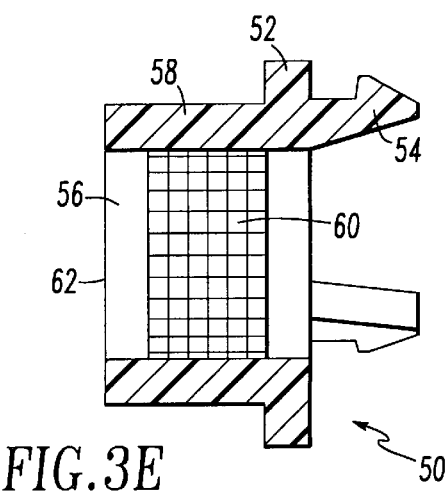
Figure 3F:
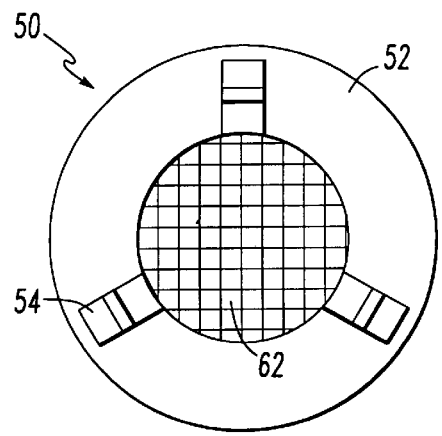

FIG. 2A shows a side view of a first embodiment of the present invention. This embodiment is the presently most-preferred embodiment. FIG. 2B shows a median section, and FIG. 2C shows a perspective view of the parts prior to assembly.

The device has a choke portion 32 and a filter portion 34. The choke portion 32 has an air passage 42, leading to a constriction 44 which terminates in socket 46, which is a socket for a spline wrench. This portion has a pipe thread, indicated as 33, formed on its exterior surface. This pipe thread is for screwing the filter choke assembly into a threaded port in a brake valve casting to control the rate of discharge of air from a space in the brake valve. Pipe thread 33 is not shown in FIG. 2A nor in FIG. 2C.

Choke portion 32 also has a flange 48 which can be snapped into groove 49 in filter portion 34. Filter portion 34 has a base 36 containing inner groove 49 for attachment to the choke portion 32. Filter portion 34 also has a frame 25 having member consisting of ring 38 supported by legs 39. Legs 3a are attached to the base 36.

The spaces 140 between the legs 39 of frame 25 are covered with mesh filters 40, and the port 141 in the center of the top ring 38 is covered by mesh filter 41. In this embodiment, the filter portion 34 can be lengthened as needed, to increase the total area of the mesh filters 40.

Figure 4:
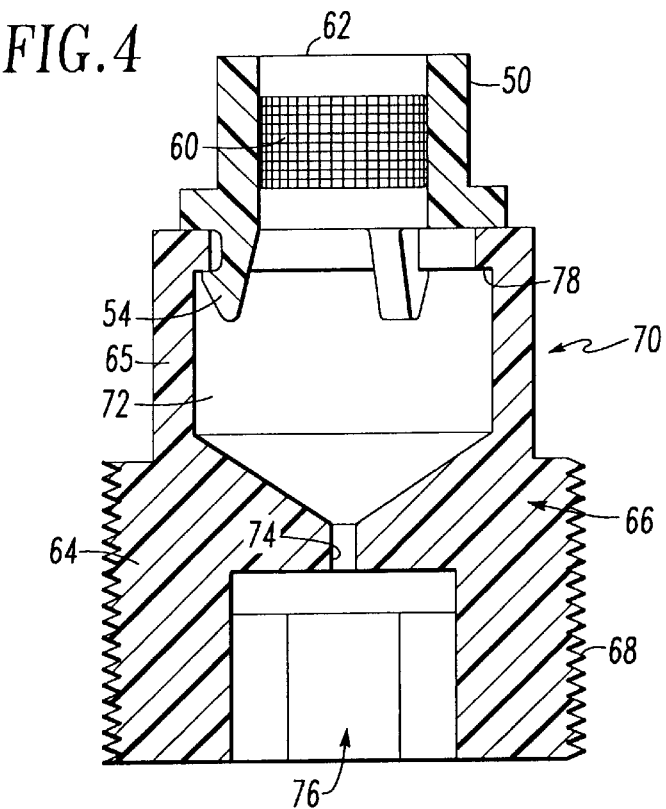
FIG. 4 shows the filter portion and the choke portion of the second embodiment assembled.

FIGS. 3 and 4 show a second embodiment of the present invention. FIG. 3 shows several views and a cross-section of the filter portion 50, and FIG. 4 shows the assembled unit 70 consisting of filter portion 50 assembled to the choke portion 64.

The filter portion 50 has a base ring 52 which supports three snap portions 54. It has a frame 55 having a pair of legs 58, and a top ring 56.

The spaces 160 between the legs 58 are covered by mesh 60, and the port 162 in the center of top ring 56 is covered by mesh 62.

The choke portion 66 has base portion 64 and top portion 65. Top portion 65 has flange 78 which catch the snap portions 54 of the mesh portion 50. Choke portion 66 has flow passage 72 which terminates in constriction 74, which terminates in socket 76, which is a socket for a spline wrench. Pipe threads 68 are formed on the outside surface of base portion 64.

FIG. 5 shows several views and a section of a filter portion 80 of a third embodiment of the present invention. This filter portion 80 has a base ring 82 supporting a cylindrical frame 84, to which a V-shaped portion 86 is mounted. The ends of the V-shaped portion 86 have protrusions 87, which may be used to snap it into a choke portion (not shown). Mesh filters 88 which are formed as segments of a cone, are attached to the V-shaped frame 86 and the base ring 82.

Figure 7:
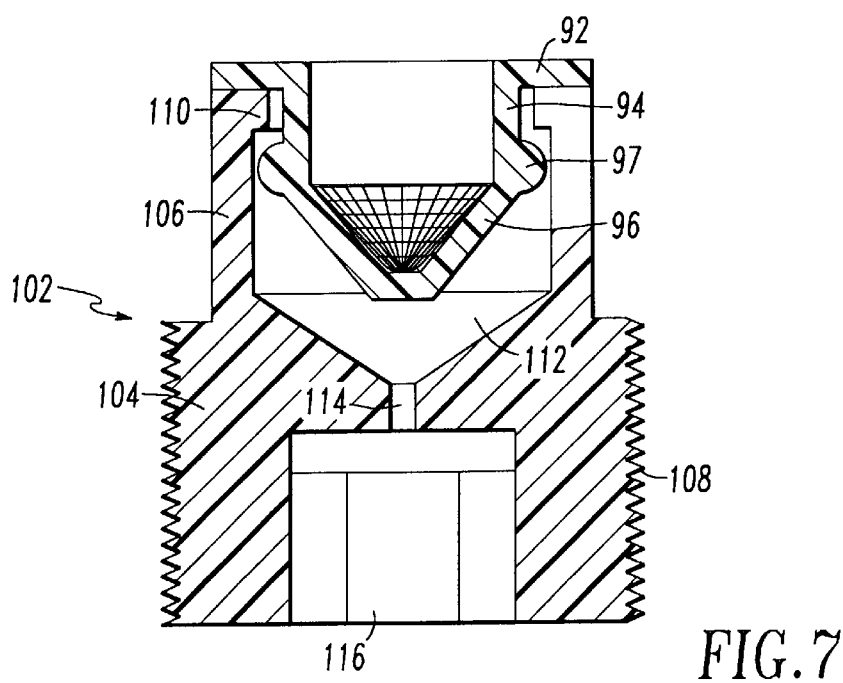
FIG. 7 shows the filter portion and choke portion of the fourth embodiment assembled.
Figure 5A:
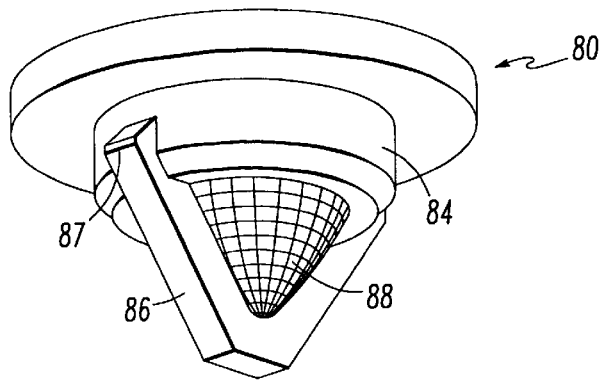
FIG. 5 shows several views and a cross-section of a filter portion of a third embodiment.
Figure 5B:
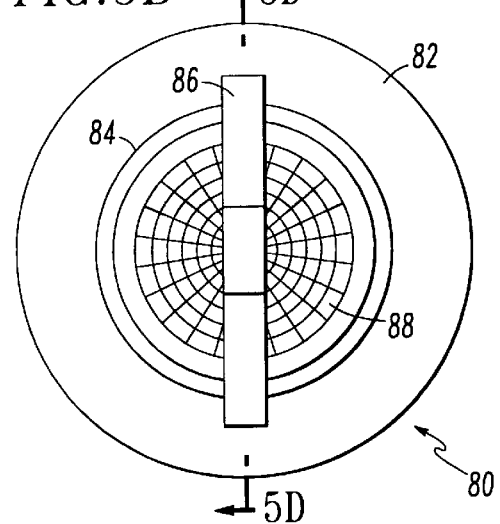
Figure 5C:
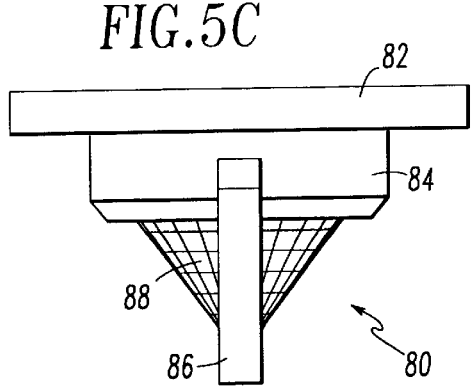
Figure 5D:
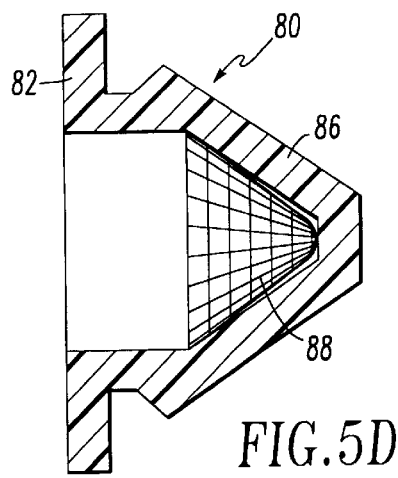
Figure 5E:
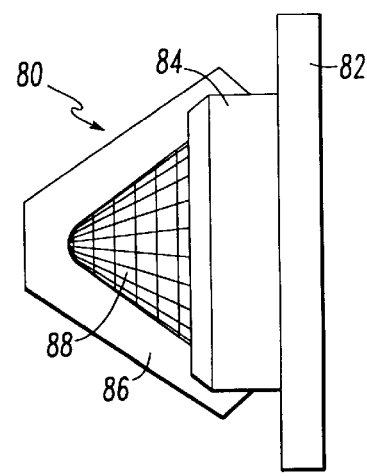
Figure 6A:
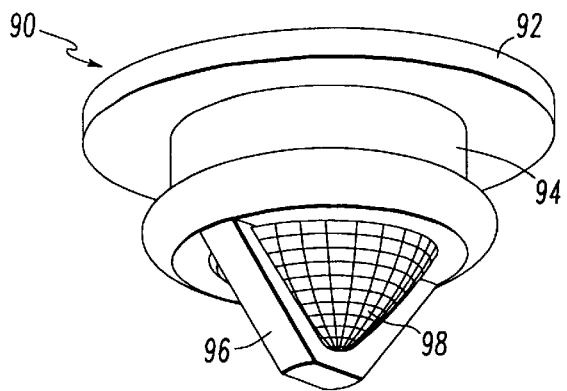
FIG. 6 shows several views of a filter portion of a fourth embodiment.
Figure 6B:
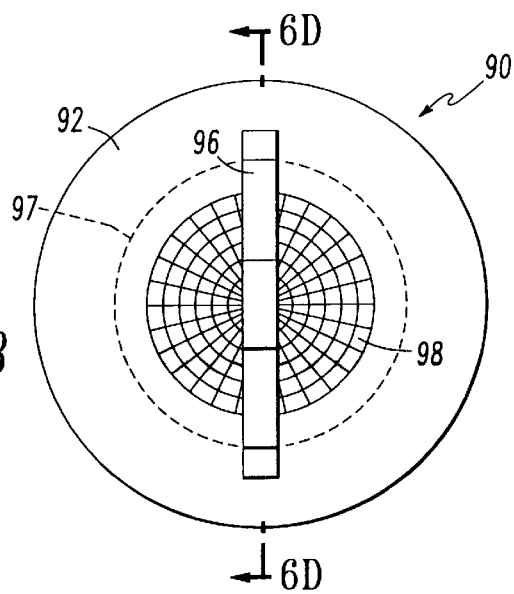
Figure 6C:
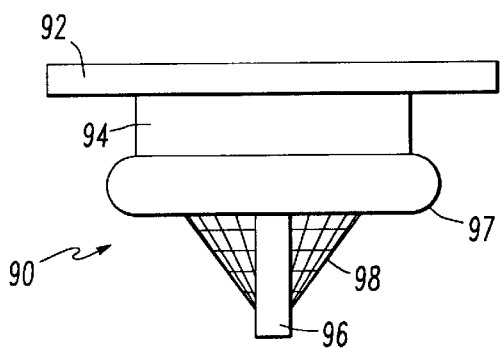
Figure 6D:
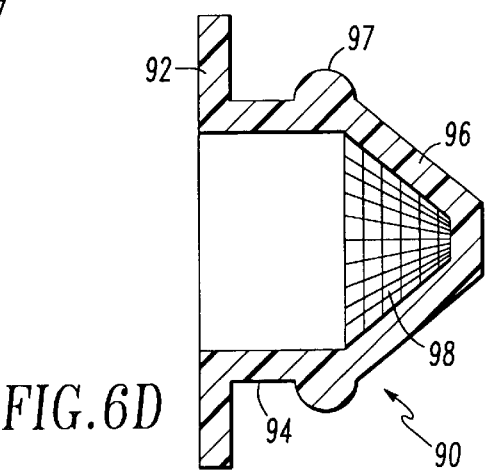

FIG. 6 shows several views and a section of a filter portion 90 of a fourth embodiment of the present invention, and FIG. 7 shows filter portion 90 snapped into choke portion 102. Filter portion 90 has a base ring 92, cylindrical portion 94 and snap ring 97. A V-shaped frame 96 is attached to snap ring 97. V-shaped frame 96 supports a pair of mesh filters 98.

Choke portion 102 shown in FIG. 7 has base portion 104 and top portion 106. Top portion 106 has an inside flange 110 which holds snap ring 97, when filter portion 90 is snapped into choke portion 102. Choke portion 102 has a converging portion 112 which leads to constriction 114. Constriction 114 leads to socket 116, which is a socket for a spline wrench.

The outer surface of base portion 104 of choke portion 102 has pipe threads 108, for attachment to an exhaust port in a brake valve casting, the exhaust port having internal pipe threads.

Now, discussing the invention more broadly, there is disclosed a choke for connection to a fluid flow passage for controlling fluid flow through the passage. The choke is required only to function for fluid flow in a single predetermined direction. The choke has means for attachment to the fluid passage. It also has an internal fluid flow passage, which has at least one constriction. One or more mesh filters are located in the internal fluid flow passage of the choke. The mesh filters are located upstream of the constriction for flow in the predetermined direction of the choke. The mesh filters serve to remove debris from the fluid which would otherwise interfere with fluid flow through the orifice. The means for attachment to the fluid passage may be a pipe thread formed on an outer surface of the choke, so that the choke can be screwed into a fluid flow passage which has internal pipe threads. The choke may have a socket for a wrench, to facilitate the step of screwing it into the fluid flow passage. The socket may be for an Allen wrench, or, as is more common in the railroad industry, a spline wrench. The socket may be formed on the downstream side of the constriction of the choke, relative to the predetermined flow direction. The mesh filter or mesh filters may have a total area exceeding the largest cross-sectional area of the fluid passage in the choke. This may be done by having the filters extend some distance in a distance parallel to the fluid passage in the choke.

The choke may be formed as a first portion having a constriction, and a second portion formed as a frame for supporting the mesh filter or filters. It is desirable for the first choke portion to be made of a metal which has good corrosion resistant properties. Metal is generally preferred over plastic because of the generally superior dimensional stability of metals. The second portion does not require high dimensional stability, and may be formed of a plastic material. The mesh, likewise, may be formed of a plastic material, as for instance, nylon.

The mesh filters may be formed so as to have a curvature which is concave toward the upstream direction of flow for flow in the predetermined flow direction. In this manner, if there is any significant drag force on the filters, the mesh opposes it by tension in the mesh. The mesh filters may be formed as portions of a cone, portions of a cylinder, or as round disks.

In another aspect, the present invention provides a method of producing a precision choke for precise control of fluid flow in a fluid flow passage. The method includes forming a first choke portion which has a constriction of a predetermined size. This choke portion is formed of a material having corrosion resistance and good dimensional stability. The method also includes providing a second choke portion, the second choke portion being for support of one or more mesh filters. The method also includes bonding the mesh filter or filters to the second choke portion, and assembling the second choke portion to the first choke portion. The step of bonding the filter or filters to the second choke portion may be done by gluing or cementing the mesh to the second choke portion. Another method of bonding the mesh to the second choke portion is by placing the mesh in contact with the second choke portion, and heating them until the second choke portion softens and bonds itself to the mesh.

In another aspect, the present invention provides a method of producing a precision choke for precise control of fluid flow in a fluid flow passage. The method includes forming a first choke portion which has a constriction of a predetermined size. This portion of the choke is formed of a material which has good corrosion resistance, and good dimensional stability. The method also includes creating a mold for forming a second portion which is for support of one or more mesh filters. One or more pieces of the mesh filter material are placed in the mold. A liquid material is then placed in the mold, and the liquid material is caused to solidify in a manner which bonds it to the mesh filters and forms the second portion of the choke which supports the mesh. The first and second portions are then assembled to form the completed choke.

The material which forms the second portion of the choke may be a material with a melting point lower than that of the mesh. It is heated to the molten state and then put in the mold where it bonds to the mesh and solidifies. The material which forms the second portion of the choke may also be a thermosetting material which is introduced into the mold in its liquid state, and is then heated so that it bonds to the mesh and solidifies.

The material which forms the second portion of the choke may also be an epoxy material, which is a mixture of a resin and a catalyst which is formed as a liquid. This is placed in the mold where the catalytic process causes it to set to form the second portion of the choke bonded to the mesh.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

We claim:

1. A choke for connection to a first fluid flow passage, said choke for controlling a flow of fluid in a predetermined flow direction through such first fluid flow passage, said choke comprising:

(a) means disposed on said choke for attaching said choke to such first fluid flow passage;

(b) a second fluid flow passage through said choke, said second fluid flow passage having at least one constriction therein;

(c) a frame upstream of said constriction for fluid flowing in such predetermined flow direction, said frame having a plurality of mesh filters covering spaces between members of said frame, said mesh filters being for removal of debris from such fluid which could otherwise interfere with fluid flow through said constriction; and whereby said choke provides a precisely controlled and reproducible obstruction to such fluid flow.

2. A choke according to claim 1 wherein said means for attaching said choke to such first fluid flow passage comprises an external pipe thread formed on an outside surface of said choke, said external pipe thread being for screwing said choke into an internal pipe thread formed within such first fluid flow passage.

3. A choke according to claim 1 wherein said choke has a socket downstream of said constriction for fluid flowing in such predetermined flow direction, said socket being for a wrench, such wrench being for rotating said choke to screw it into such first fluid flow passage.

4. A choke according to claim 3 wherein said socket is a socket for a spline wrench.

5. A choke according to claim 1 wherein said mesh filters have a total cross-sectional area exceeding a cross-sectional area of said second fluid flow passage.

6. A choke according to claim 1 wherein said choke has a first portion having said constriction, and a second portion including said frame and said mesh filters.

7. A choke according to claim 6 wherein said first portion is formed of a metal having good corrosion resistant properties.

8. A choke according to claim 6 wherein said second portion is formed of a first plastic material.

9. A choke according to claim 1 wherein said mesh filters are formed of a second plastic material.

10. A choke according to claim 1 wherein said mesh filters are formed of nylon.

11. A choke according to claim 1 wherein said mesh filters have a curvature which is concave toward an upstream direction relative to a fluid flow in such predetermined flow direction.

12. A choke according to claim 1 wherein at least one of said mesh filters is formed as at least a portion of a cone.

13. A choke according to claim 1 wherein at least one of said mesh filters is formed as at least a portion of a cylinder.

14. A method of producing a precision choke for precise control of fluid flow in a first fluid flow passage, said method comprising:

(a) forming a first choke portion having a second fluid flow passage therethrough, said second fluid flow passage having a constriction of a predetermined size formed therein, said first choke portion being formed of a material having corrosion resistance and good dimensional stability, said first choke portion having means for attaching it to said first fluid flow passage;

(b) providing a second choke portion, said second choke portion having a frame upstream of said constriction for fluid flowing in said predetermined flow direction, said frame having a plurality of spaces between members of said frame, said frame being for support of at least one mesh filter;

(c) bonding said at least one mesh filter to said frame to cover said spaces between members of said frame; and (d) assembling said second choke portion to said first choke portion.

15. A method according to claim 14 wherein said step of bonding said mesh filters to said second choke portion consists of gluing said mesh filters to said second choke portion.

16. A method according to claim 14 wherein said step of bonding said mesh filters to said second choke portion consists of placing said mesh filters in contact with said second choke portion and heating said mesh filters and said second choke portion until thermal bonding occurs.

17. A method of producing a precision choke for precise control of fluid flow in a first fluid flow passage, said method comprising:
- (a) forming a first choke portion having a second fluid flow passage therethrough, said second fluid flow passage having a constriction of a predetermined size formed therein, said first choke portion formed of a material having corrosion resistance and good dimensional stability, said first choke portion having means for attaching it to said first fluid flow passage;
- (b) providing a mold for casting a second choke portion, said second choke portion having a frame for support of a plurality of mesh filters;
- (c) placing said mesh filters within said mold in positions to cover spaces between members of said frame; and
- (d) introducing a liquid material into said mold, said liquid contacting said mesh filters;
- (e) causing said liquid to solidify to form said second choke portion bonded to said mesh filters; and
- (f) assembling said second choke portion to said first choke portion.

18. A method according to claim 17 wherein said liquid material is a molten material, having a melting point lower than a melting point of said mesh filters, and said molten material solidifies, forming a bond to said mesh filters as its temperature drops below its melting point while contained in said mold.

* * * * *